United States Patent
Alexander

(10) Patent No.: US 12,395,535 B2
(45) Date of Patent: Aug. 19, 2025

(54) SECURITY TECHNIQUES FOR ENTERPRISE MESSAGING SYSTEMS

(71) Applicant: Salesforce, Inc., San Francisco, CA (US)

(72) Inventor: Joshua David Alexander, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 169 days.

(21) Appl. No.: 18/162,438

(22) Filed: Jan. 31, 2023

(65) Prior Publication Data

US 2024/0259436 A1  Aug. 1, 2024

(51) Int. Cl.
 *H04L 9/40* (2022.01)
(52) U.S. Cl.
 CPC .......... *H04L 63/205* (2013.01); *H04L 63/102* (2013.01); *H04L 63/1425* (2013.01); *H04L 2463/082* (2013.01)
(58) Field of Classification Search
 CPC . H04L 63/205; H04L 63/102; H04L 63/1425; H04L 2463/082
 See application file for complete search history.

(56) References Cited

U.S. PATENT DOCUMENTS

| | | | | |
|---|---|---|---|---|
| 8,205,239 | B1* | 6/2012 | Satish | H04L 63/102 726/28 |
| 9,781,149 | B1* | 10/2017 | Himler | H04L 63/1425 |
| 10,880,322 | B1* | 12/2020 | Jakobsson | H04L 51/08 |
| 10,956,957 | B2* | 3/2021 | Szeto | H04L 51/02 |
| 11,393,009 | B1* | 7/2022 | Szeto | G06Q 30/0631 |
| 11,429,741 | B2 | 8/2022 | Hay et al. | |
| 11,882,158 | B2* | 1/2024 | Cui | H04W 12/68 |
| 2016/0285790 | A1* | 9/2016 | Szeto | G06Q 30/0635 |
| 2018/0152471 | A1* | 5/2018 | Jakobsson | H04L 63/1425 |
| 2018/0167402 | A1* | 6/2018 | Scheidler | G06N 20/00 |
| 2019/0171845 | A1* | 6/2019 | Dotan-Cohen | H04L 51/02 |
| 2019/0238532 | A1* | 8/2019 | Alexander | H04L 9/08 |

(Continued)

FOREIGN PATENT DOCUMENTS

CA          3106353 A1    4/2020

*Primary Examiner* — J. Brant Murphy
(74) *Attorney, Agent, or Firm* — Kowert, Hood, Munyon, Rankin & Goetzel, P.C.; Catherine L. Gerhardt; Dean M. Munyon

(57) ABSTRACT

The disclosed techniques identify and prevent suspicious activity occurring within a messaging software executed via an enterprise system. The disclosed techniques detect a current message sent from a particular user account of the messaging software executed via the enterprise system at a user device. The techniques compare the current message and user account activity associated with the current message with a behavior profile of the particular user account, where the behavior profile is generated based on prior user account activity that includes one or more prior messages sent from the user account via the enterprise system, and where the prior account activity occurs before the current message. Based on the comparing and predetermined risk levels, the disclosed techniques determine a risk level of the current message. Based on the determined risk level of the current message, the disclosed techniques perform preventative actions with respect to the particular user account.

20 Claims, 7 Drawing Sheets

(56) References Cited

U.S. PATENT DOCUMENTS

| | | | |
|---|---|---|---|
| 2019/0364034 A1* | 11/2019 | Alexander | H04L 63/12 |
| 2019/0392450 A1* | 12/2019 | Gosset | H04L 63/101 |
| 2020/0053111 A1* | 2/2020 | Jakobsson | H04L 63/1416 |
| 2020/0099682 A1* | 3/2020 | Alexander | H04L 63/105 |
| 2020/0099696 A1* | 3/2020 | Alexander | H04L 63/08 |
| 2020/0137110 A1* | 4/2020 | Tyler | H04L 63/1483 |
| 2021/0314269 A1* | 10/2021 | Stewart | H04L 63/1425 |
| 2022/0060465 A1 | 2/2022 | Alexander et al. | |

\* cited by examiner

Example Message 402

Behavior Profiles 162

Database 150

| Behavior Profile ID 412 | Characters 414 | Links? 416 | Suspicious History? 418 | Connects With User? 420 |
|---|---|---|---|---|
| 1234ABC | "u" | Yes | No | Yes |
| 1234ABC | "c," "u," "later" | No | No | No |
| ABCD123 | "you" | No | Yes | No |
| 4321CBA | "can't," "i'm" | No | No | Yes |

SECURITY TECHNIQUES FOR ENTERPRISE MESSAGING SYSTEMS

BACKGROUND

Technical Field

This disclosure relates to electronic communication, in particular, to techniques for monitoring and preventing malicious activity on messaging platforms (e.g., enterprise messaging systems).

Description of the Related Art

Computer systems may include multiple computers, workstations, servers, and storage systems, each performing different tasks. For example, in some computer systems, a particular computer may be executing software for managing e-mail messages, while other workstations, in the computer systems, may be used for word processing, web browsing, database storage, and the like.

Messaging software is a common method for allowing end users to communicate virtually via their various computing devices, e.g., by downloading a messaging application or opening a web application via their web browser. During operation of a messaging application, multiple users generate and send electronic messages to one another. Such messages may include text, including links, images, videos, etc. Generally, messaging applications require users to log in to their account prior to sending messages to their various contacts. For example, a user may log in to their email and, once they are logged in, may send an email to any of various other users. In some scenarios, this includes sending emails to users they do not know, which is often referred to as spam email. Email communication platforms often include spam filters to identify and remove spam emails before they reach an end users email inbox.

DETAILED DESCRIPTION OF EMBODIMENTS

Figure 1:
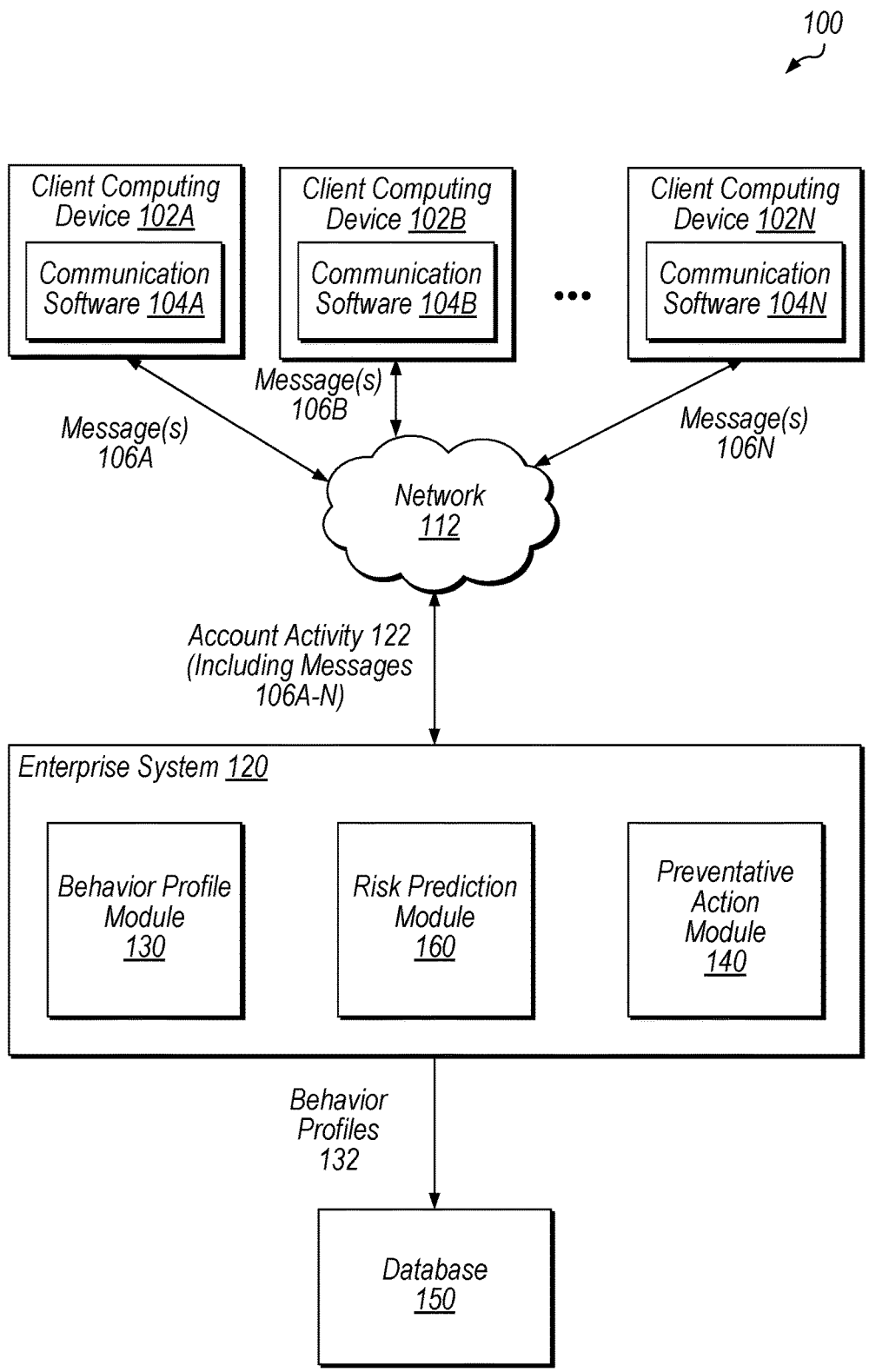
FIG. 1 is a block diagram illustrating an example system configured to detect suspicious activity within an enterprise messaging environment, according to some embodiments.

Certain communication platforms, such as email, are often associated with spam or phishing due to the open nature of these platforms (e.g., anyone can send out emails to a specific group of individuals without being required to provide credentials in order to communicate with the specific group of individuals). As a result, end users will often quickly identify suspicious or malicious emails and report them. In addition, many email communication platforms include spam monitoring features that catch and report on this behavior.

In contrast, within messaging platforms such as Slack™, end users are required to log in to their account within the enterprise (and potentially provide multiple levels of credentials, including username, password, multi-factor authentication, etc.) prior to being able to communicate with other users of the enterprise system. Consequently, if an end user receives a Slack message from a fellow employee of the enterprise system (particularly one they communicate with on a regular basis) and this message includes a link, they are less likely to question the authenticity of the link. Said another way, a hacker would need to infiltrate a controlled network of an enterprise system (one for which a limited number of users have access or credentials) before being able to communicate with other users within the controlled network, which instills a greater sense of security for users sending messages within the enterprise system.

Because users accessing an enterprise messaging environment are more likely to trust other users they are communicating with, in one example, if a user having an account with the enterprise system were to share or sell (e.g., for bitcoin) their login credentials to an unauthorized user, this would likely present a greater level of threat than a spam email, for example. This is due to the fact that it is less likely for an individual user receiving a message within an enterprise system from a trusted colleague to question the legitimacy of the message. After obtaining the enterprise login credentials, the unauthorized user is able to communicate with thousands of authorized users via an enterprise messaging system (e.g., Slack within Salesforce). In such situations, when the unauthorized user logs in using the stolen credentials, they will appear authentic and trustworthy to other users of the enterprise system.

Due to the plethora of information that is available to the enterprise messaging system for different users, the disclosed security techniques are able to track and build user behavior profiles. The disclosed techniques are generally directed to protecting users utilizing internal messaging systems, particularly messaging software, such as Slack, within an enterprise system. The disclosed security techniques provide an informed security system configured to build security profiles for various users of the messaging software within the enterprise system. For example, the internal security techniques may assign an identifier (ID) to a user account and gather behavioral data for a user (or in situations of malicious activity, multiple users) utilizing this account in order to build a profile for this user. The ID may be generated based on a user's device (or any hardware) being used to access the messaging software to track activity, may be generated based on the account itself (e.g., an account number), or both, etc. For example, the type of device used to log in to an account within the enterprise system and send a message is just one example of the information that is used to build a behavior profile for this account. In disclosed techniques, any of various types of information associated with a user account may be utilized to build a behavior profile.

As the disclosed security system builds behavior profiles for different users of the enterprise messaging system over time, the system can compare the real-time messaging behavior of users against their built behavior profiles. In this way, the disclosed techniques are able to determine in real-time how an individual communicates (i.e., their communication patterns). As one specific example, if a user, Josh, does not historically send URLs via Slack according to his behavior profile, the system will identify this as anomalous behavior and flag Josh's user account for preventative action. In this example, the system determines whether Josh is acting differently than he did previously (e.g., in the last 30, 60, 90, etc. days). As one example of preventative action, the security system might place the user currently accessing Josh's account into an adversarial engagement model (AEM) to track the user's behavior going forward. The AEM will appear to the end user like the real Salesforce Slack environment but in actuality is a mirrored or simulated environment. In this way, the security system is able to continue monitoring the potentially malicious user's behavior without granting this user access to sensitive information (e.g., private user data within the enterprise system). More generally, if the disclosed security system detects that an account is exhibiting anomalous behavior, the system will then determine whether this user/behavior is low, medium, or high risk. Based on this determination, the system decides which type of preventative action to perform. Preventative action and risk thresholds are discussed in further detail below with reference to FIG. 3.

As used herein, the term "enterprise system" is intended to be construed according to its well-understood meaning, which includes a set of large-scale software packages that track and control complex operations of one or more entities. For example, an enterprise system may track and control complex operations for businesses that provide services such as customer relationship management (CRM), enterprise resource planning (ERP), supply chain management (SCM), etc. Enterprise software may be downloadable via the internet and hosted by a third-party provider (which may be referred to as a software-as-a-service (SaaS)). As used herein, the term "messaging software" refers to online messaging tools that can be downloaded onto devices of end users and are accessible via an account login. Businesses using enterprise systems (such as Salesforce.com) can have their own set of accounts for their employees such that employees are only able to communicate with other employees of the business via the messaging software by logging into their enterprise user account. The following are examples of messaging software: Slack, Email, Microsoft Teams, Zoom, Google Meet, Cisco Webex, etc.

In various embodiments, the disclosed techniques may advantageously reduce or remove threats to end users communicating in an enterprise messaging system. For example, the disclosed security system prevents users from, or reduces the number of users, clicking on a link received in a message that redirects the user to a website with a virus. Similarly, the disclosed techniques may advantageously prevent unauthorized users from accessing private data stored within the enterprise system. Reducing and preventing suspicious activity on an enterprise messaging platform may advantageously inject or imbue a greater amount of trust in the messaging system (i.e., entities such as business and their end users trust the system more and are more willing to participate in private communication via the system). This increased level of trust allows users to share private data via the messaging system while being confident that this data will not be obtained by malicious entities. For example, use of the enterprise messaging system advantageously allow for end users to share confidential information such as medical records, legal documents, etc. These techniques may be further be advantageous over prior approaches as they allow for honey pot techniques, such as adversarial engagement models (AEM) within the enterprise system. In addition, these techniques may be advantageous over prior approaches due to the ability to automate the generation and comparison of behavior profiles for users of the enterprise system. An exemplary application of these techniques will now be discussed, starting with reference to FIG. 1.

Example Networked System

Turning now to FIG. 1, a block diagram of an example system configured to detect suspicious activity within an enterprise messaging environment is shown. Within system 100, a network 112 may represent the Internet, an intranet, or any other suitable type of computer network. The network 112 may couple one or more client computing devices 102A-102N to enterprise system 120. Client computing devices 102A, 102B, through 102N includes communication software 104A, 104B, through 104N. Client computing devices may also be referred to user computing devices herein. The communication software 104A-104N may include communication applications (e.g., Slack, Microsoft Teams™, etc.) downloaded on the client computing devices 102A-102N. System 100 is an enterprise system that includes database 150 (which may also be referred to as a "database system" or "database computer system" or "database store") and enterprise system 120, which in turn includes a behavior profile module 130, a risk prediction module 160, and a preventative action module 140. In various embodiments, clients may be requestors to the enterprise system 120, which includes requests to communicate (send messages 106A-106N) via the enterprise system 120 with other client computing devices 102. Client connections with enterprise system 120 allows for messages to be sent to other client devices over the network 112. As discussed in further detail below, the enterprise system 120 monitors and prevents suspicious messaging activity.

In the illustrated embodiment, enterprise system 120 receives account activity 122 that includes messages 106A-106N via network 112 originating from various client computing devices 102A-102N and corresponding to user accounts of the enterprise system 120 utilized to send these messages. Note that enterprise system 120 may include hundreds, thousands, millions, etc. of users having user accounts with the system. For example, a business executing via enterprise system 120 may have 70,000 employees for which system 120 monitors messaging activity. The account activity includes various actions taken by users of devices 102A-102N, including actions taken via communication software 104A-104N. In some embodiments, enterprise system 120 is a server system that executes communication software locally to system 100 (e.g., Salesforce.com). In other embodiments, enterprise system 120 is a server executed via a cloud service (e.g., Amazon Web Services™) and is not necessarily limited to a local system such as Salesforce.com. Still further and as discussed above, in some situations, enterprise system 120 is executed as an SaaS system.

Enterprise system 120 executes behavior profile module 130 to generate behavior profiles for user accounts of the communication software 104A-104N access via the client computing devices 102A-102N. For example, behavior profile module 130 generates behavior profiles for user accounts based on account activity 122 corresponding to the user accounts. As such, the behavior profiles indicate communication habits of users corresponding to the user accounts used to send messages via the enterprise system 120. Before creating a behavior profile for a given user account, behavior profile module 130 generates and assigns profile identifiers (IDs) to user accounts. Module 130 may generate a profile ID based on hardware information of a client computing device 102A. For example, a profile ID could be generated based on information stored in a secure storage of device 102A such as service set identifier (SSID) stored in a cache of the device 102A that identifies various hardware devices in the vicinity of the client computing device (desktop monitor, mobile device, etc.). The behavior profile IDs may be generated based on any of various observable hardware aspects of a client device (which are not necessarily local to the user device in the general sense, but data regarding these aspects may be stored locally to the device). In other embodiments, the behavior profile IDs are generated based on non-hardware information, such as a user's name, account number, randomly generated numbers, software downloaded on the user's device, etc.

As discussed in further detail below with reference to FIGS. 2 and 4B, behavior profile module 130 generates and stores behavior profiles 132 in database 150 based on account activity 122. Behavior profile module 130 continuously updates the behavior profiles 132 stored in database 150 as new account activity 122 is tracked by enterprise system 120 for various different accounts.

In addition to building behavior profiles for user accounts used to send messages 106A-106N, enterprise system 120 executes risk prediction module 160 to determine whether current activity of user accounts is anomalous (and potentially suspicious). For example, risk prediction module 160 compares a current message 106A with prior account activity 122 (including prior messages) sent from a particular user account utilized to send the current message 106A. Risk prediction module 160 accomplishes this comparison using a behavior profile built by module 130 for the particular user account. After determining whether a current message is anomalous, risk prediction module 160 sends a risk prediction to preventative action module 140. As discussed in further detail below with reference to FIG. 2, the risk prediction may indicate various comparison results, including an extent to which the current message differs from prior messages sent from this user account and whether various account activity corresponding to the current messages differs (and to what extent) from prior account activity corresponding to prior messages.

Preventative action module 140 determines, based on risk predictions received from module 160, whether to perform one or more preventative actions. For example, if the risk prediction indicates that a current message is not risky (e.g., since this message is not anomalous for the account), then preventative action module 140 may determine not to perform preventative actions. If, however, the risk prediction received from risk prediction module 160 indicates that the current message is anomalous (and potentially risky), preventative action module 140 performs one or more preventative actions with respect to the corresponding user account. While a message may not be anomalous, it may still be suspicious. For example, if a current message includes a link and the link, message content, message recipient, and message timing are not anomalous for this user (the attributes of the current message match attributes of prior messages originating from this account), but the link itself is suspicious (e.g., leads to a suspicious website), then risk prediction module 160 may still identify the current message as risky. As discussed in further detail below with reference to FIG. 3, preventative action module 140 may determine a level of risk associated with the current message. Then, preventative action module 140 determines how many and what type of preventative actions to perform based on comparing the determined risk level to predetermined risk level thresholds. As discussed in further detail below with reference to FIG. 3, in some embodiments preventative action module 340 sends results of performing preventative actions to behavior profile module 130. In such situations, behavior profile module 130 updates behavior profiles based on these preventative action results.

Example Enterprise System

Figure 2:
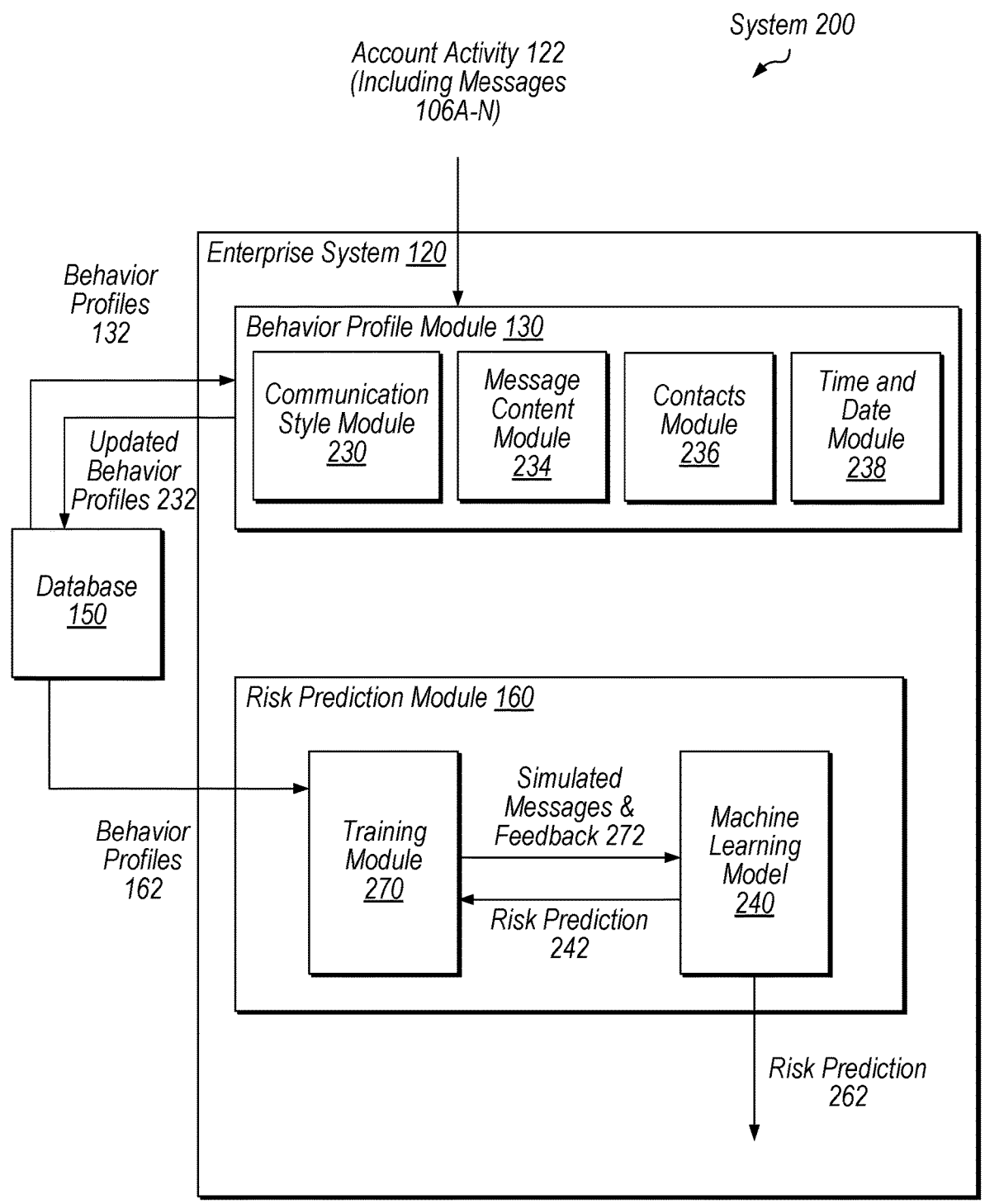
FIG. 2 is a block diagram depicting example behavior profile and risk prediction modules, according to some embodiments.

Turning now to FIG. 2, a block diagram is shown depicting example behavior profile and risk prediction modules. The diagram shown in FIG. 2 illustrates an example of how enterprise system 120 builds behavior profiles for end users and trains a machine learning model 240 to detect whether current messages and user activity match behavior profiles generated by the enterprise system 120. In the illustrated embodiment, system 200 includes database 150 and enterprise system 120, which includes behavior profile module 130 (which in turn includes communication style module 230, message content module 234, contacts module 236, and time and date module 238) and risk prediction module 160 (training module 270 and machine learning model 240).

Behavior profile module 130, in the illustrated embodiment, receives current behavior profiles 132 and generates updated behavior profiles based on new account activity 122 (including messages 106A-106N). In the illustrated embodiment, behavior profile module 130 stores the updated behavior profiles 232 in database 150. In some embodiments, behavior profile module 130 only generates updated behavior profiles 232 using account activity 122 that is identified as normal or typical for a given user via risk prediction techniques as well as the techniques discussed below with reference to FIG. 3. In some embodiments, behavior profile module 130 generates behavior profiles 132 for new user accounts of the enterprise system 120 (i.e., generates new profiles based on newly received account activity 122 for users that do not have previous messaging activity).

Behavior profile module 130 generates or updates behavior profiles 132 based on different categories of information included in account activity 122. For a given user account, behavior profile module 130 executes communication style module 230 to identify and label a user account with a specific communication style. For example, communication style module 230 analyzes whether the user types "u" instead of "you" based on the messages 106 included in the account activity 122. Message content module 234 identifies the type of content a given user includes in their messages. For example, module 234 determines whether this user generally includes links in their messages, whether they tag other users (e.g., user tags such as @Josh) in their messages, whether they include quotes in their messages, whether they request access to privileged documents (e.g., from their supervisor via a message), etc. Message content module 234 adds this information to the user's behavior profile.

Behavior profile module 130 executes contacts module 236 to identify whether a given user has sent messages to another user in the past and a frequency at which the given user sends messages to this other user. For example, contacts module 236 may determine a list of regular contacts for each user and add this list to the user's behavior profile. Further in this example, contacts module 236 may determine how many times a day, week, month, etc. the given user sends messages to one or more other users and a number of messages sent within different time intervals. Time and date module 238 determines when (e.g., time of day, day of the week, etc.) a given user typically sends messages to one or more other users.

In some embodiments, behavior profile module 130 determines a time of day and day of the week that a given user typically logs in or logs out of their user account with enterprise system 120. For example, behavior profile module 130 may identify that Josh typically logs in to his account at 9 AM Monday through Thursday and stores this information in Josh's behavior profile. If, however, Josh logs into his account on a Saturday at 1 PM, risk prediction module 160 (as discussed in further detail below) may identify that this is anomalous behavior according to Josh's behavior profile. In some embodiments, behavior profile module 130 determines and adds the following message attributes to users' behavior profiles: average length of messages, average response times to messages from different users, types of slang used in messages, whether the user utilizes contractions in their messages, whether the recipient is a regular correspondent of the user, a time window in which messages are most often sent by this user, etc.

Risk prediction module 160, in the illustrated embodiment, retrieves behavior profiles 162 from database 150 and inputs the behavior profiles into a training module 270. Training module 270, in the illustrated embodiment, trains machine learning model 240 based on behavior profiles 162. For example, training module 270 inputs a behavior profile 162, including a behavior profile ID, for a given user and a simulated message into machine learning model 240. In some embodiments, training module 270 inputs an actual (non-simulated) message sent from the user account corresponding to the behavior profile 162 input to model 240 during training. In addition, training module 270 may input a label indicating whether the simulated message matches the behavior profile 162. Machine learning model 240, in the illustrated embodiment, outputs a risk prediction 242 for the simulated message. For example, model 240 outputs a prediction indicating whether the simulated message matches a behavior profile for the user or whether this simulated message is anomalous. During training, if the prediction output by model 240 is incorrect, training module 270 sends feedback 272 to the model specifying new weights for the model. For example, training module 270 may increase the weights of simulated messages which the model output incorrect predictions. Once the weights of the model 240 have been updated, training module 270 inputs a behavior profile (either the same as the initial input or a different behavior profile) and either the previously simulated message or a new message into machine learning model 240 to see if the model has improved in its prediction. If a new prediction output by model 240 is correct, then training module 270 may pause training at least until behavior profile module 130 generates updated behavior profiles 232 (at which time module 270 retrains machine learning model 240 based on the updated behavior profiles 232). In this way, model 240 may be continuously trained by training module 270 as new messaging activity is added to various behavior profiles.

When executing the trained machine learning model 240, risk prediction module 160 inputs both a current message (which has yet to be categorized as anomalous) and a behavior profile ID into machine learning model 240 and the model outputs a risk prediction 262 for the current message. The risk prediction 262 output by model 240 may be a value on a scale from 0 to 1, with 0 indicating anomalous and 1 indicating not anomalous. In this example, if model 240 outputs a risk prediction 262 indicating that a current message is anomalous, then enterprise system 120 may categorize the current message as suspicious (and potentially malicious). Machine learning model 240 is trained to compare a current message (and the contextual information accompanying this message, such as a time of day it was sent) with prior messages (and their corresponding contextual information) sent from a user account corresponding to the behavior profile ID received with the current message.

In some embodiments, the risk prediction 262 output by machine learning model 240 for the current message indicates an extent to which the current message (and corresponding account activity 122) matches the behavior profile (e.g., prior messages and the respective corresponding activity) of the user account from which it was sent. For example, a risk prediction 262 of 0.1 might indicate that the current message activity matches up to 90% with prior messages activity sent from this account. As one specific example, if a user Josh has previously sent a message that includes a uniform resource locator (URL) link, but has not previously sent a message with a URL link to user John, then the trained machine learning model 240 will identify a current message that includes a URL link and is sent from Josh to John as anomalous and may output a risk prediction 262 of 0.7 (e.g., the URL link is not necessarily anomalous, but the fact that Josh is sending it to John is anomalous). In some embodiments, machine learning model 240 outputs additional comparison results in addition to outputting a risk prediction 262. For example, model 240 may output a matrix of risk predictions 262 indicating, for various attributes of a behavior profile, an extent to which a current message matches one or more of the attributes established for this user account based on prior messages.

In some embodiments, training module 270 trains a plurality of different machine learning models 240. For example, training module 270 may train individualized machine learning models that are executable to predict whether a message is anomalous for a given user account according to the behavior profile corresponding to this account. Said another way, a first machine learning model is trained for a first user account to identify whether messages sent from this first account match prior behavior of the first account while a second machine learning model is trained for a second, different user account e.g., to identify whether messages sent from the second account match prior behavior of the second account. In such embodiments, when using a trained individualize machine learning model, risk prediction module 160 simply inputs a message sent from a particular user account corresponding to this individualize model and the model will predict whether the message is anomalous for the particular user account. One or more machine learning models trained by training module 270 may be any of various types of machine learning models. For example, machine learning model 240 may be a neural network, a linear regression model, a logistic regression model, a decision tree, a naïve bayes model, etc.

Figure 3:
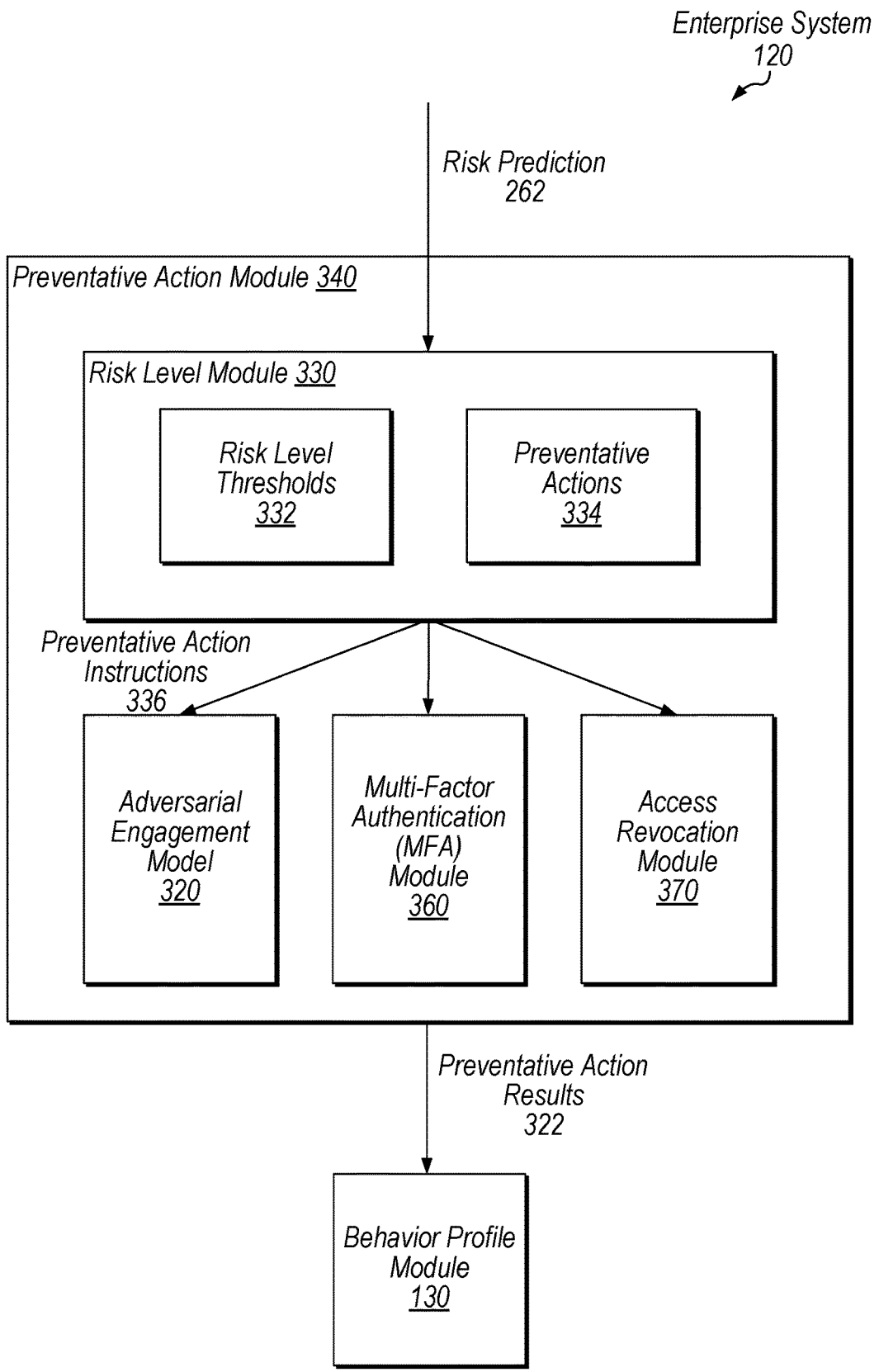
FIG. 3 is a block diagram illustrating an example preventative action module, according to some embodiments.

In addition to generating a risk prediction 262 via machine learning model 240, risk prediction module 160 performs various other risk determination operations. For example, risk prediction module 160 may run a link included in a current message through a scan to determine if it leads to a suspicious location (e.g., a malicious website). After checking the URL, risk prediction module 160 may send the results of the URL check with risk prediction 262 e.g., to preventative action module 340 as shown in FIG. 3. If the URL leads to a suspicious website, then the results will include a flag indicating a potentially suspicious URL. As another example, risk prediction module 160 may identify whether the current message includes requests for confidential or private data. For example, if a user is requesting to access confidential medical records stored by the enterprise system 120, but this user does not have privileges to access these records, module 160 may flag this as a potentially suspicious message. This flag will be included with the risk prediction 262 provided to preventative action module 340.

Example Preventative Action Module

FIG. 3 is a block diagram depicting an example preventative action module. In the illustrated embodiment, enterprise system 220 includes behavior profile module 130 and preventative action module 340, which in turn includes risk level module 330, adversarial engagement module 320, multi-factor authentication (MFA) module 360, and access revocation module 370. Enterprise system 120 executes preventative action module 340 to determine what types of actions to take when a risk prediction 262 indicates, e.g., that a user account has been hacked.

Risk level module 330, in the illustrated embodiment, receives a risk prediction 262 (from the machine learning model 240 shown in FIG. 2). Risk level module 330 determines, based on risk prediction 262 whether a current message is high, medium, or low risk, for example. Risk level module 330 compares risk prediction 262 with one or more predetermined risk level thresholds 332. For example, if a risk prediction 262 is 0.2 and module 330 compares this risk value with three different risk level thresholds 332 of 0.3, 0.6, and 0.9, then module 330 will determine that the risk value of 0.2 is below the low level risk threshold of 0.3. As such, the current message associated with the risk value of 0.2 is considered of low risk by module 330. Based on determining a risk level, module 330 determines one or more preventative actions 334 corresponding to the determined risk level and executes these one or more actions.

When determining a risk level, module 330 may consider other contextual information included with the risk prediction 262 (e.g., information indicating whether a URL links to a suspicious website) and will factor this information into the risk level determination. For example, if risk prediction 262 is a low value such as 0.3 but the link included in the corresponding message is indicated as suspicious by risk prediction module 160, then risk level module 330 may increase the risk prediction value to 0.6. In addition, risk level module 330 may determine the type of anomaly. For example, if the message appears to be sent via a noise bot, then this message is unlikely to cause serious harm within enterprise system 120. Thus, in this example, module 330 may assign a low risk level to the current message.

Once risk level module 330 identifies one or more preventative actions 334 to perform based on the risk level thresholds, module 330 sends preventative action instructions 336 to one of adversarial engagement model 320, multi-factor authentication (MFA) module 360, and access revocation module 370. If risk level module 330 selects an AEM as a preventative action for a current message, module 330 sends instructions 336 to model 320 specifying to place the user account corresponding to the current message in an AEM environment. For example, if a message is classified as high risk, then placing the user account that sent this message in an adversarial engagement model (e.g., placing them in a fake environment that mimics the actual enterprise system 120 messaging environment) allows enterprise system 120 to track actions taken by a malicious user that took over the account. Tracking user actions enables the enterprise system 120 to better identify the motives of the malicious user without granting them access to sensitive information. If a user is malicious, then they will probably start trying to authentically interact with the AEM (because the user is not familiar with the legitimate environment). For example, the malicious user may try to send messages to a user "Bob" that the AEM generated as a simulation (the AEM made this user up and they do not actually exist within enterprise system 120). As one specific example, AEM 320 may place the potentially malicious user into a "copy-cat" version of Slack. In this way, module 340 is able to identify what the malicious user is trying to do and to determine how to stop them before they have actually successfully executed their plan of attack. If the user is not malicious and module 340 places them in an AEM environment, then the user is likely to quickly recognize this is a fake environment and can notify the system. For example, if the user is a legitimate user of the user account, they will notice that there are now "fake" users generated as part of the adversarial engagement model environment.

If risk level module 330 selects a multi-factor authentication procedure from a set of preventative actions 334, then module 330 sends instructions 336 to module 360 specifying to send one or more requests for factors to a user account corresponding to the current message. In this situation, if the user is authentic, they will easily be able to provide factors to module 360 in response to the MFA requests. If, however, the user is malicious they are likely to fail these MFA requests (which will confirm for preventative action module 340 that this user is malicious). If the user fails the MFA request, preventative action module 340 may send further instructions to access revocation module 370 to cut off this malicious user's access to private data. In such situations, preventative action module 340 may also lock the user account until a time at which the legitimate user can reset their credentials (e.g., reset their username and password).

If risk level module 330 selects access revocation as a preventative action, then module 330 sends instructions 336 to access revocation module 370 specifying to revoke one or more access privileges of a user account corresponding to the current message. For example, if module 340 is confident that this user is malicious based on the risk prediction 262, then module 340 may decide to either completely cut this user off from enterprise system 120 or may choose one or more areas (e.g., a database of system 120 storing confidential information) of enterprise system 120 to remove from a list of areas that this user account is authorized to access (e.g., to reduce loss of private data).

In some embodiments, preventative action module 340 provides results 322 of one or more preventative actions 334 to behavior profile module 130. For example, these results 322 may be provided as feedback in situations in which the user of the account correctly responds to multi-factor authentication requests and then update this user's behavior profile accordingly. As another example, if the user of the account identifies an adversarial engagement model as a simulated environment, then module 340 knows that this is an authentic user and will update this user's behavior profile accordingly. For example, updating the user's behavior profile may include adding details from the current message to this user's behavior profile because the system 120 now knows that this is legitimate behavior for the authentic user of this user account.

Example Behavior Profile Database

Figure 4A:
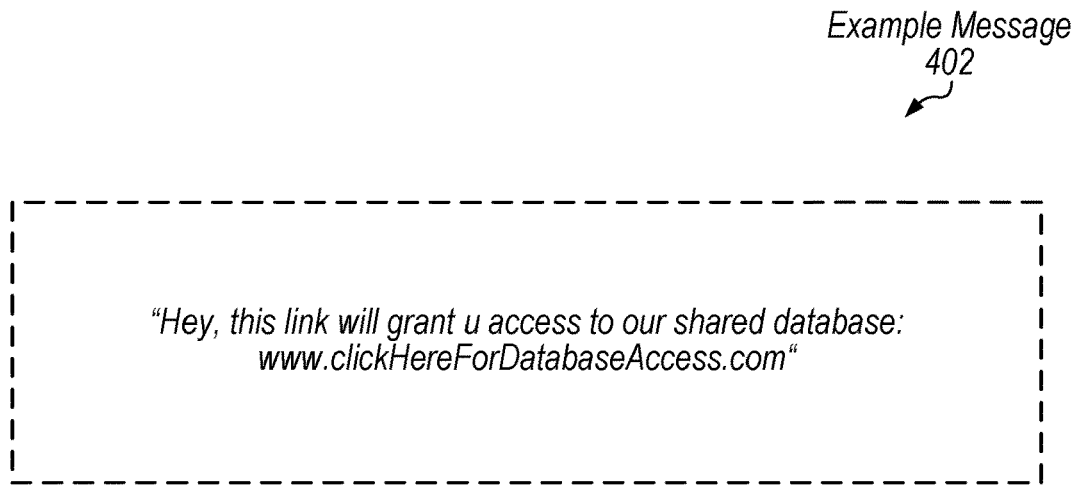
FIGS. 4A and 4B depict an example message and an example behavior profile database, respectively, according to some embodiments.
Figure 4B:

FIGS. 4A and 4B depict an example message and an example behavior profile database, respectively. In the illustrated embodiment, the top portion includes an example message 402 sent from one user of an enterprise system to another user of the enterprise system. The example message shown in FIG. 4A includes a link to a website. For example, behavior profile module 130 may identify that the link in this message links to a suspicious web site based on running this link through a computerized robot (often referred to as a "bot") configured to identify details of the link destination. In this example, while the behavior profile of the user that sent the example message does not have prior suspicious activity and the message itself is in a communication style associated with the user that sent the message, the preventative action module 340 may determine to perform a preventative action such as revoking access privileges of the user account corresponding to the example message 402. For example, the behavior profile of this user indicates that this user typically communicates in an abbreviated style, including using terms such as "u" instead of spelling out the term "you," but the link included in example message 402 is a link to a suspicious website. As such, preventative action module 340 may still choose to perform preventative actions.

In FIG. 4B an example behavior profile database 150 is shown storing information for different user's behavior profiles 162. In the illustrated embodiment, a table stored in database 150 is shown with the following columns: behavior profile ID 412, characters 414, links 416, suspicious history 418, and connects with user 420. Note that the columns shown in the table storing data in database 150 are examples of the behavior profile attributes that may be stored for different users' behavior profiles and that any of various information about different users' activity may be stored in database 150 as part of a user's profile. The rows of the table stored in database 150 store values for the various attribute columns listed above and collectively the values stored in a given row make up the attributes of a behavior profile for a given user account. For example, the first row of the table stores attribute values for a user account that has been assigned a behavior profile ID of "1234ABC" by behavior profile module 130. In this example, the first row of the table also includes the text character "u" indicating that this user typically types "u" in place of "you." For example, the user corresponding to behavior profile 1234ABC may type "c u later" instead of "see you later."

Example Method

Figure 5:
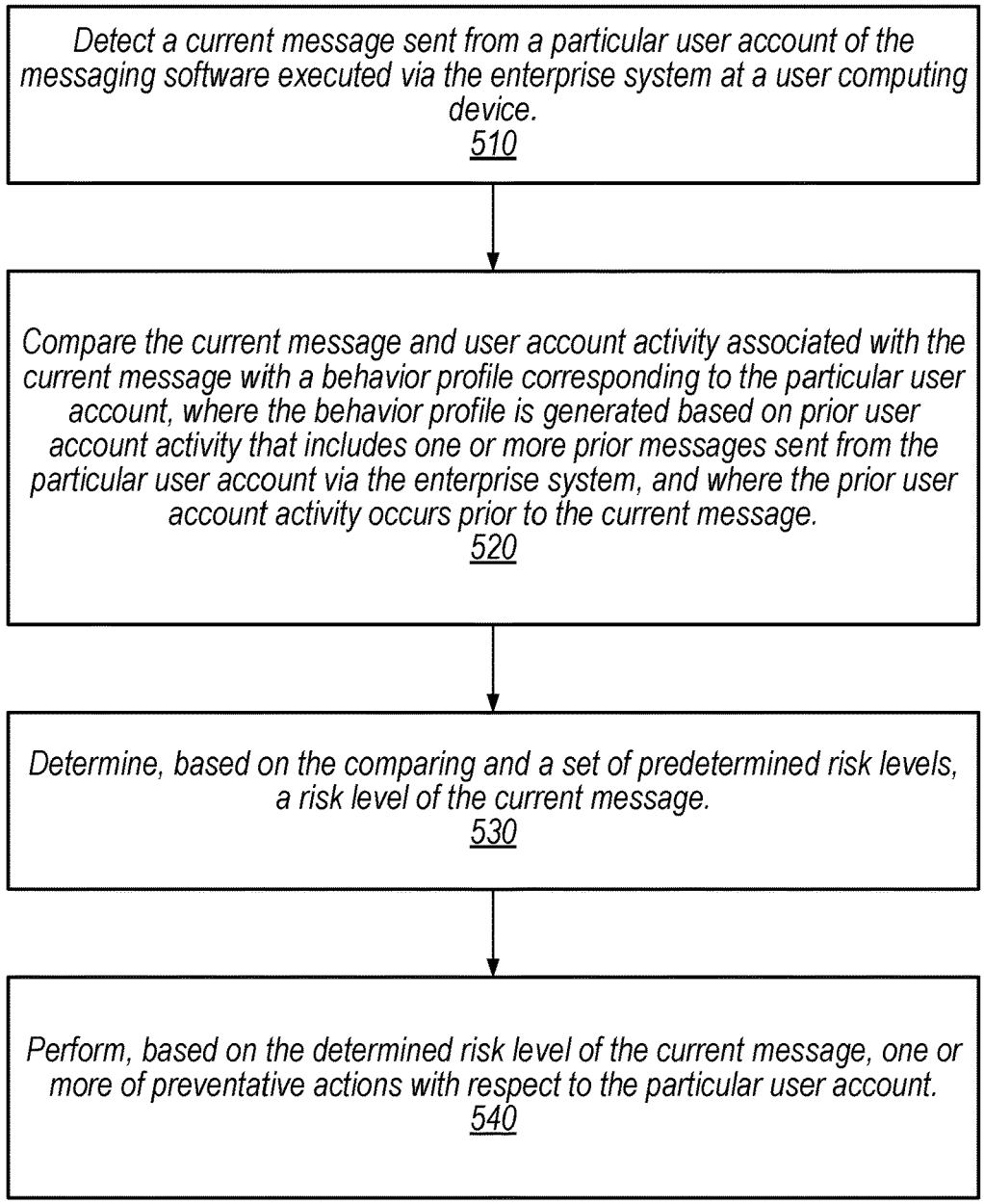
FIG. 5 is an example method for identifying and preventing suspicious activity occurring within a messaging software executed via an enterprise system, according to some embodiments.

FIG. 5 is a flow diagram depicting an example method for identifying and preventing suspicious activity occurring within a messaging software executed via an enterprise system, according to some embodiments. The method 500 shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 500 is performed by enterprise system 120.

At 510, in the illustrated embodiment, execution of the method detects a current message sent from a particular user account of the messaging software executed via the enterprise system at a user computing device. In some embodiments, the particular user account is an account of the enterprise system, where the messaging software enables communication between users having accounts with the enterprise system.

At 520, execution of the method includes comparing the current message and user account activity associated with the current message with a behavior profile corresponding to the particular user account, where the behavior profile is generated based on prior user account activity that includes one or more prior messages sent from the particular user account via the enterprise system, and where the prior user account activity occurs prior to the current message. In some embodiments, the method further includes training, using behavior profiles of a plurality of user accounts of the enterprise system, a machine learning model. In some embodiments, the training includes inputting a set of messages and a behavior profile identifier corresponding to a given user account into the machine learning model. In some embodiments, the training further includes adjusting, based on whether output of the machine learning model for the set of messages matches known labels indicating whether the messages are anomalous for the given user account, one or more weights of the machine learning model. In some embodiments, performing the comparing includes inputting a behavior profile identifier that identifies the particular user account and the current message into the trained machine learning model and identifying, based on output of the trained machine learning model, whether the current message matches one or more prior messages included in the behavior profile of the particular user account.

In some embodiments, the method includes training, using behavior profiles of respective ones of a plurality of user accounts, a plurality of customized machine learning models, where the trained customized machine learning models are uniquely trained for the respective user accounts. In some embodiments, the training includes inputting a set of prior messages sent from the particular user account into a machine learning model to be customized for the particular user account and adjusting weights of the machine learning model based on outputs of the machine learning model. In some embodiments, the method further includes inputting the current message into the trained machine learning model customized to the particular user account. In some embodiments, the comparing includes determining whether one or more of the following attributes match for the current message and one or more prior messages sent from the particular user account: contractions, abbreviations, message length, typing speed, time of day, vocabulary, user tags, user account being contacted, and links.

At 530, execution of the method includes determining, based on the comparing and a set of predetermined risk levels, a risk level of the current message. In some embodiments, determining the risk level for the current message includes comparing a prediction score output by the trained machine learning model with one or more risk level thresholds and identifying, based on the risk level threshold the prediction score satisfies, one or more preventative actions to perform with respect to the particular user account. In some embodiments, determining the risk level for the current message includes scanning one or more links included in the current message and determining, based on the scanning, whether the one or more links redirect to suspicious content.

At 540, execution of the method includes performing, based on the determined risk level of the current message, one or more preventative actions with respect to the particular user account. In some embodiments, performing the one or more preventative actions with respect to the particular user account includes placing the particular user account in an adversarial engagement model (AEM) that displays a simulated environment that mimics an environment of the messaging software of the enterprise system. In some embodiments, performing the one or more preventative actions includes determining, based on actions taken by a user of the particular user account within the AEM, whether to perform one or more additional preventative actions.

In some embodiments, performing the one or more preventative actions includes sending a request for at least one factor in a multi-factor authentication procedure to the particular user account and in response to the particular user account providing a legitimate factor for the multi-factor authentication procedure, updating the behavior profile of the particular user account. In some embodiments, performing the one or more preventative actions includes revoking, based on determining that the risk level of the current message is a high risk level, one or more access privileges of the particular user account.

Exemplary Multi-Tenant Database System

Figure 6:
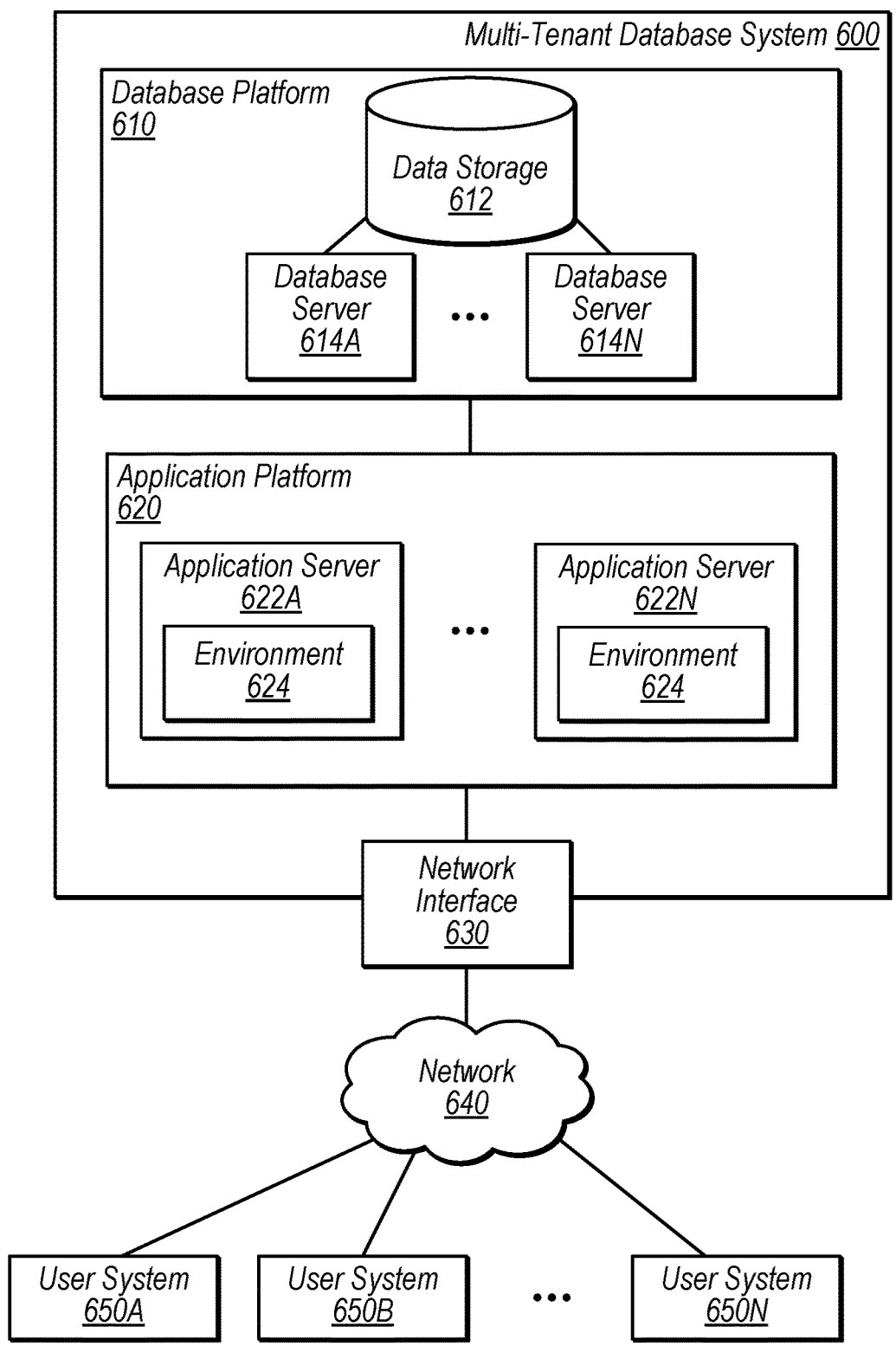
FIG. 6 is a block diagram illustrating elements of a multi-tenant system, according to some embodiments.

Turning now to FIG. 6, an exemplary multi-tenant database system (MTS) 600 in which various techniques of the present disclosure can be implemented is shown—e.g., system 100 may be MTS 600. In FIG. 6, MTS 600 includes a database platform 610, an application platform 620, and a network interface 630 connected to a network 640. Also as shown, database platform 610 includes a data storage 612 and a set of database servers 614A-N that interact with data storage 612, and application platform 620 includes a set of application servers 622A-N having respective environments 624. In the illustrated embodiment, MTS 600 is connected to various user systems 650A-N through network 640. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 600, in various embodiments, is a set of computer systems that together provide various services to users (alternatively referred to as "tenants") that interact with MTS 600. In some embodiments, MTS 600 implements a customer relationship management (CRM) system that provides mechanism for tenants (e.g., companies, government bodies, etc.) to manage their relationships and interactions with customers and potential customers. For example, MTS 600 might enable tenants to store customer contact information (e.g., a customer's website, email address, telephone number, and social media data), identify opportunities, record service issues, and manage marketing campaigns. MTS 600 may also enable those tenants to identify how customers have been communicated with, what the customers have bought, when the customers last purchased items, and what the customers paid. To provide the services of a CRM system and/or other services, as shown, MTS 600 includes a database platform 610 and an application platform 620.

Database platform 610, in various embodiments, is a combination of hardware elements and software routines that implement database services for storing and managing data of MTS 600, including tenant data. As shown, database platform 610 includes data storage 612. Data storage 612, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 612 is used to implement a database (e.g., database 150) comprising a collection of information that is organized in a way that allows for access, storage, and manipulation of the information. Data storage 612 may implement a single database, a distributed database, a collection of distributed databases, a database with redundant online or offline backups or other redundancies, etc. As part of implementing the database, data storage 612 may store files (e.g., files storing behavior profiles 132) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 600 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 612 is organized as part of a log-structured merge-tree (LSM tree—e.g., enterprise system 120 may implement an LSM tree). An LSM tree normally includes two high-level components: an in-memory buffer and a persistent storage. In operation, a database server 614 may initially write database records into a local in-memory buffer before later flushing those records to the persistent storage (e.g., data storage 612). As part of flushing database records, the database server 614 may write the database records into new files that are included in a "top" level of the LSM tree. Over time, the database records may be rewritten by database servers 614 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 612.

When a database server 614 wishes to access a database record for a particular key, the database server 614 may traverse the different levels of the LSM tree for files that potentially include a database record for that particular key. If the database server 614 determines that a file may include a relevant database record, the database server 614 may fetch the file from data storage 612 into a memory of the database server 614. The database server 614 may then check the fetched file for a database record having the particular key. In various embodiments, database records are immutable once written to data storage 612. Accordingly, if the database server 614 wishes to modify the value of a row of a table (which may be identified from the accessed database record), the database server 614 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 614, in various embodiments, are hardware elements, software routines, or a combination thereof capable of providing database services, such as data storage, data retrieval, and/or data manipulation. A database server

614 may correspond to database node executed as part of a plurality of database nodes that make up database 150. Such database services may be provided by database servers 614 to components (e.g., application servers 622) within MTS 600 and to components external to MTS 600. As an example, a database server 614 may receive a database transaction request from an application server 622 that is requesting data to be written to or read from data storage 612. The database transaction request may specify an SQL SELECT command to select one or more rows from one or more database tables. The contents of a row may be defined in a database record and thus database server 614 may locate and return one or more database records that correspond to the selected one or more table rows. In various cases, the database transaction request may instruct database server 614 to write one or more database records for the LSM tree—database servers 614 maintain the LSM tree implemented on database platform 610. In some embodiments, database servers 614 implement a relational database management system (RDMS) or object oriented database management system (OODBMS) that facilitates storage and retrieval of information against data storage 612. In various cases, database servers 614 may communicate with each other to facilitate the processing of transactions. For example, database server 614A may communicate with database server 614N to determine if database server 614N has written a database record into its in-memory buffer for a particular key.

Application platform 620, in various embodiments, is a combination of hardware elements and software routines that implement and execute CRM software applications as well as provide related data, code, forms, web pages and other information to and from user systems 650 and store related data, objects, web page content, and other tenant information via database platform 610. In order to facilitate these services, in various embodiments, application platform 620 communicates with database platform 610 to store, access, and manipulate data. In some instances, application platform 620 may communicate with database platform 610 via different network connections. For example, one application server 622 may be coupled via a local area network and another application server 622 may be coupled via a direct network link. Transfer Control Protocol and Internet Protocol (TCP/IP) are exemplary protocols for communicating between application platform 620 and database platform 610, however, it will be apparent to those skilled in the art that other transport protocols may be used depending on the network interconnect used.

Application servers 622, in various embodiments, are hardware elements, software routines, or a combination thereof capable of providing services of application platform 620, including processing requests received from tenants of MTS 600. Application servers 622, in various embodiments, can spawn environments 624 that are usable for various purposes, such as providing functionality for developers to develop, execute, and manage applications (e.g., business logic). Data may be transferred into an environment 624 from another environment 624 and/or from database platform 610. In some cases, environments 624 cannot access data from other environments 624 unless such data is expressly shared. In some embodiments, multiple environments 624 can be associated with a single tenant.

Application platform 620 may provide user systems 650 access to multiple, different hosted (standard and/or custom) applications, including a CRM application and/or applications developed by tenants. In various embodiments, application platform 620 may manage creation of the applications, testing of the applications, storage of the applications into database objects at data storage 612, execution of the applications in an environment 624 (e.g., a virtual machine of a process space), or any combination thereof. In some embodiments, application platform 620 may add and remove application servers 622 from a server pool at any time for any reason, there may be no server affinity for a user and/or organization to a specific application server 622. In some embodiments, an interface system (not shown) implementing a load balancing function (e.g., an F5 Big-TP load balancer) is located between the application servers 622 and the user systems 650 and is configured to distribute requests to the application servers 622. In some embodiments, the load balancer uses a least connections algorithm to route user requests to the application servers 622. Other examples of load balancing algorithms, such as are round robin and observed response time, also can be used. For example, in certain embodiments, three consecutive requests from the same user could hit three different servers 622, and three requests from different users could hit the same server 622.

In some embodiments, MTS 600 provides security mechanisms, such as encryption, to keep each tenant's data separate unless the data is shared. If more than one server 614 or 622 is used, they may be located in close proximity to one another (e.g., in a server farm located in a single building or campus), or they may be distributed at locations remote from one another (e.g., one or more servers 614 located in city A and one or more servers 622 located in city B). Accordingly, MTS 600 may include one or more logically and/or physically connected servers distributed locally or across one or more geographic locations.

One or more users (e.g., via user systems 650) may interact with MTS 600 via network 640. User system 650 may correspond to, for example, a tenant of MTS 600, a provider (e.g., an administrator) of MTS 600, or a third party. Each user system 650 may be a desktop personal computer, workstation, laptop, PDA, cell phone, or any Wireless Access Protocol (WAP) enabled device or any other computing device capable of interfacing directly or indirectly to the Internet or other network connection. User system 650 may include dedicated hardware configured to interface with MTS 600 over network 640. User system 650 may execute a graphical user interface (GUI) corresponding to MTS 600, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 650 to access, process, and view information and pages available to it from MTS 600 over network 640. Each user system 650 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 600 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 650 may be users in differing capacities, the capacity of a particular user system 650 might be determined one or more permission levels associated with the current user. For example, when a user is using a particular user system 650 to interact with MTS 600, that user system 650 may have capacities (e.g., user privileges) allotted to that user. But when an administrator is using the same user system 650 to interact with MTS 600, the user system 650 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 600 that are allocated at the tenant level while other data structures are managed at the user level.

In some embodiments, a user system 650 and its components are configurable using applications, such as a browser, that include computer code executable on one or more processing elements. Similarly, in some embodiments, MTS 600 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 640 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 650 may communicate with MTS 600 using TCP/IP and, at a higher network level, use other common Internet protocols to communicate, such as HTTP, FTP, AFS, WAP, etc. For example, where HTTP is used, user system 650 might include an HTTP client commonly referred to as a "browser" for sending and receiving HTTP messages from an HTTP server at MTS 600. Such a server might be implemented as the sole network interface between MTS 600 and network 640, but other techniques might be used as well or instead. In some implementations, the interface between MTS 600 and network 640 includes load sharing functionality, such as round-robin HTTP request distributors to balance loads and distribute incoming HTTP requests evenly over a plurality of servers.

In various embodiments, user systems 650 communicate with application servers 622 to request and update system-level and tenant-level data from MTS 600 that may require one or more queries to data storage 612. In some embodiments, MTS 600 automatically generates one or more SQL statements (the SQL query) designed to access the desired information. In some cases, user systems 650 may generate requests having a specific format corresponding to at least a portion of MTS 600. As an example, user systems 650 may request to move data objects into a particular environment 624 using an object notation that describes an object relationship mapping (e.g., a JavaScript object notation mapping) of the specified plurality of objects.

Exemplary Computer System

Figure 7:
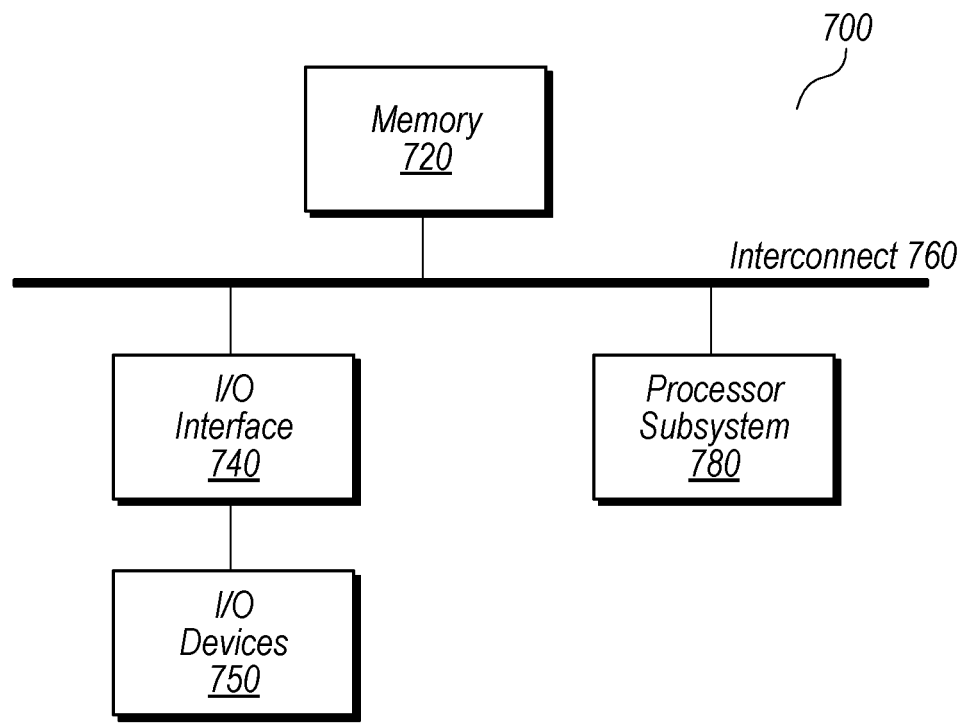
FIG. 7 is a block diagram illustrating elements of a computer system configured to implement various systems described in the present disclosure, according to some embodiments.

Turning now to FIG. 7, a block diagram of an exemplary computer system 700, which may implement system 100, enterprise system 120, database 150, MTS 600, and/or user system 650, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement enterprise system 120 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over Wi-Fi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for identifying and preventing suspicious activity occurring within a messaging software executed via an enterprise system, the method comprising:

detecting a current message sent from a particular user account of the messaging software executed via the enterprise system at a user computing device;

comparing the current message and user account activity associated with the current message with a behavior profile corresponding to the particular user account, wherein the behavior profile is generated based on prior user account activity that includes one or more prior messages sent from the particular user account via the enterprise system, wherein the prior user account activity occurs prior to the current message, and wherein the prior user account activity includes, relative to the one or more prior messages sent from the particular user account, textual analysis of language used in the prior messages and an analysis of characteristics associated with entry of the one or more prior messages into the enterprise system;

determining, based on the comparing and a set of predetermined risk levels, a risk level of the current message; and performing, based on the determined risk level of the current message, one or more preventative actions with respect to the particular user account.

2. The method of claim 1, further comprising:

training, using behavior profiles of a plurality of user accounts of the enterprise system, a machine learning model, wherein the training includes:

inputting a set of messages and a behavior profile identifier corresponding to a given user account into the machine learning model; and adjusting, based on whether output of the machine learning model for the set of messages matches known labels indicating whether the messages are anomalous for the given user account, one or more weights of the machine learning model.

3. The method of claim 1, wherein performing the comparing includes:

inputting a behavior profile identifier that identifies the particular user account and the current message into a trained machine learning model; and identifying, based on output of the trained machine learning model, whether the current message matches one or more prior messages included in the behavior profile of the particular user account.

4. The method of claim 3, wherein determining the risk level for the current message includes:

comparing a prediction score output by the trained machine learning model with one or more risk level thresholds; and identifying, based on a risk level threshold the prediction score satisfies, one or more preventative actions to perform with respect to the particular user account.

5. The method of claim 1, wherein performing the one or more preventative actions with respect to the particular user account includes:

placing the particular user account in an adversarial engagement model (AEM) that displays a simulated environment that mimics an environment of the messaging software of the enterprise system; and determining, based on actions taken by a user of the particular user account within the AEM, whether to perform one or more additional preventative actions.

6. The method of claim 1, wherein performing the one or more preventative actions includes:

sending a request for at least one factor in a multi-factor authentication procedure to the particular user account; and in response to the particular user account providing a legitimate factor for the multi-factor authentication procedure, updating the behavior profile of the particular user account.

7. The method of claim 1, wherein determining the risk level for the current message includes:
scanning one or more links included in the current message; and
determining, based on the scanning, whether the one or more links redirect to suspicious content.

8. The method of claim 1, wherein performing the one or more preventative actions includes:
revoking, based on determining that the risk level of the current message is a high risk level, one or more access privileges of the particular user account.

9. The method of claim 1, wherein the textual analysis of language used in the prior messages includes an analysis of one or both of word choice and message length.

10. The method of claim 9, wherein the analysis of word choice includes an analysis of one or more of the following: abbreviations, contractions, and vocabulary.

11. A non-transitory computer-readable medium having instructions stored thereon that are capable of causing an enterprise system to implement operations comprising:
detecting a current message sent from a particular user account of a messaging software executed via the enterprise system at a user computing device;
comparing the current message and user account activity associated with the current message with a behavior profile corresponding to the particular user account, wherein the behavior profile is generated based on prior user account activity that includes one or more prior messages sent from the particular user account via the enterprise system, wherein the prior user account activity occurs prior to the current message, and wherein the prior user account activity includes, relative to the one or more prior messages sent from the particular user account, textual analysis of language used in the one or more prior messages and an analysis of characteristics associated with entry of the one or more prior messages into the enterprise system;
determining, based on the comparing and a set of predetermined risk levels, a risk level of the current message; and
performing, based on the determined risk level of the current message, one or more preventative actions with respect to the particular user account.

12. The non-transitory computer-readable medium of claim 11, wherein the operations further comprise:
training, using behavior profiles of a plurality of user accounts of the enterprise system, a machine learning model, wherein the training includes:
inputting a set of messages and a behavior profile identifier corresponding to a given user account into the machine learning model; and
adjusting, based on whether output of the machine learning model for the set of messages matches known labels indicating whether the messages are anomalous for the given user account, one or more weights of the machine learning model.

13. The non-transitory computer-readable medium of claim 11, wherein performing the comparing includes:
inputting a behavior profile identifier that identifies the particular user account and the current message into a trained machine learning model; and
identifying, based on output of the trained machine learning model, whether the current message matches one or more prior messages included in the behavior profile of the particular user account.

14. The non-transitory computer-readable medium of claim 11, wherein determining the risk level for the current message includes:
comparing a prediction score, output by a trained machine learning model for the current message, with one or more risk level thresholds; and
identifying, based on a risk level threshold the prediction score satisfies, one or more preventative actions to perform with respect to the particular user account.

15. The non-transitory computer-readable medium of claim 11, wherein the operations further comprise:
training, using behavior profiles of respective ones of a plurality of user accounts, a plurality of customized machine learning models, wherein the trained customized machine learning models are uniquely trained for the respective user accounts, including:
inputting a set of prior messages sent from the particular user account into a machine learning model to be customized for the particular user account; and
based on outputs of the machine learning model, adjusting weights of the machine learning model; and
inputting the current message into the trained machine learning model customized to the particular user account.

16. A system, comprising:
at least one processor; and
a memory having instructions stored thereon that are executable by the at least one processor to cause the system to identify and prevent suspicious activity occurring within a messaging software executed via the system, including:
detecting a current message sent from a particular user account of the messaging software executed via the system at a user computing device;
comparing the current message and user account activity associated with the current message with a behavior profile corresponding to the particular user account, wherein the behavior profile is generated based on prior user account activity that includes one or more prior messages sent from the particular user account via the system, and wherein the prior user account activity occurs prior to the current message, wherein the prior user account activity includes, relative to the one or more prior messages sent from the particular user account, textual analysis of language used in the one or more prior messages and an analysis of characteristics associated with entry of the one or more prior messages into the system; and
determining, based on the comparing, whether to perform one or more preventative actions with respect to the particular user account.

17. The system of claim 16, wherein the determining is further performed based on:
determining, from a set of predetermined risk levels, a risk level of the current message, wherein the instructions are further executable by the at least one processor to cause the system to perform, based on the determined risk level of the current message, one or more preventative actions with respect to the particular user account.

18. The system of claim 16, wherein the system is an enterprise system, and wherein the particular user account is an account of the enterprise system, and wherein the messaging software enables communication between users having accounts with the enterprise system.

19. The system of claim 16, wherein the instructions are further executable by the at least one processor to cause the system to:
    train, using behavior profiles of a plurality of user accounts of the system, a machine learning model, wherein the training includes:
        inputting a set of messages and a behavior profile identifier corresponding to a given user account into the machine learning model; and
        adjusting, based on whether output of the machine learning model for the set of messages matches known labels indicating whether the messages are anomalous for the given user account, one or more weights of the machine learning model.

20. The system of claim 16, wherein the analysis of characteristics associated with entry of prior messages into the system includes an analysis of typing speed corresponding to entry of the prior messages.

\* \* \* \* \*